United States Patent
Lam et al.

(10) Patent No.: US 9,736,298 B2
(45) Date of Patent: Aug. 15, 2017

(54) VOICE TO TEXT CONVERSION DURING ACTIVE CALL INCLUDING VOICE

(71) Applicant: Verizon Patent and Licensing Inc., Arlington, VA (US)

(72) Inventors: Andrew Wahlon Lam, River Edge, NJ (US); Jason Coglon, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 14/493,727

(22) Filed: Sep. 23, 2014

(65) Prior Publication Data

US 2016/0088150 A1 Mar. 24, 2016

(51) Int. Cl.
*H04M 3/42* (2006.01)
*H04L 29/06* (2006.01)

(52) U.S. Cl.
CPC .... *H04M 3/42221* (2013.01); *H04L 65/1083* (2013.01); *H04L 65/1096* (2013.01); *H04L 65/4015* (2013.01); *H04M 3/42382* (2013.01); *H04M 2201/40* (2013.01)

(58) Field of Classification Search
CPC ......... H04M 3/42221; H04M 3/42382; H04M 2201/40; H04L 67/02; H04L 67/42; H04L 65/00; H04W 76/02; H04W 8/18; H04N 21/00

See application file for complete search history.

(56) References Cited

U.S. PATENT DOCUMENTS

| 7,277,858 B1* | 10/2007 | Weaver | G09B 21/009 379/52 |
| 2014/0226537 A1* | 8/2014 | Kashimba | H04L 65/1069 370/261 |
| 2014/0273974 A1* | 9/2014 | Varghese | H04M 3/42246 455/412.1 |
| 2016/0164979 A1* | 6/2016 | Poscher | H04L 65/1016 370/259 |

OTHER PUBLICATIONS

U.S. Appl. No. 13/336,691, entitled Method and System for Transferring Control of a Conference Bridge, filed Dec. 23, 2011.

* cited by examiner

*Primary Examiner* — Noel Beharry
*Assistant Examiner* — Ruihua Zhang

(57) ABSTRACT

Voice to text (VTT) call transcription technologies are provided. At least one server receives a request from a mobile device to initiate a transcription of voice communication of a call between the mobile device and another device. The server, responsive to the request, establishes a bridged communication session between the server, the mobile device, the other device and a VTT system. The bridged communication session includes the voice communication of the call that is exchanged between the mobile device and the other device. The VTT system converts the voice communication of the call in the bridged communication session to a text transcription. The VTT system sends the text transcription of the voice communication of the call, for example, to the first mobile device.

20 Claims, 12 Drawing Sheets

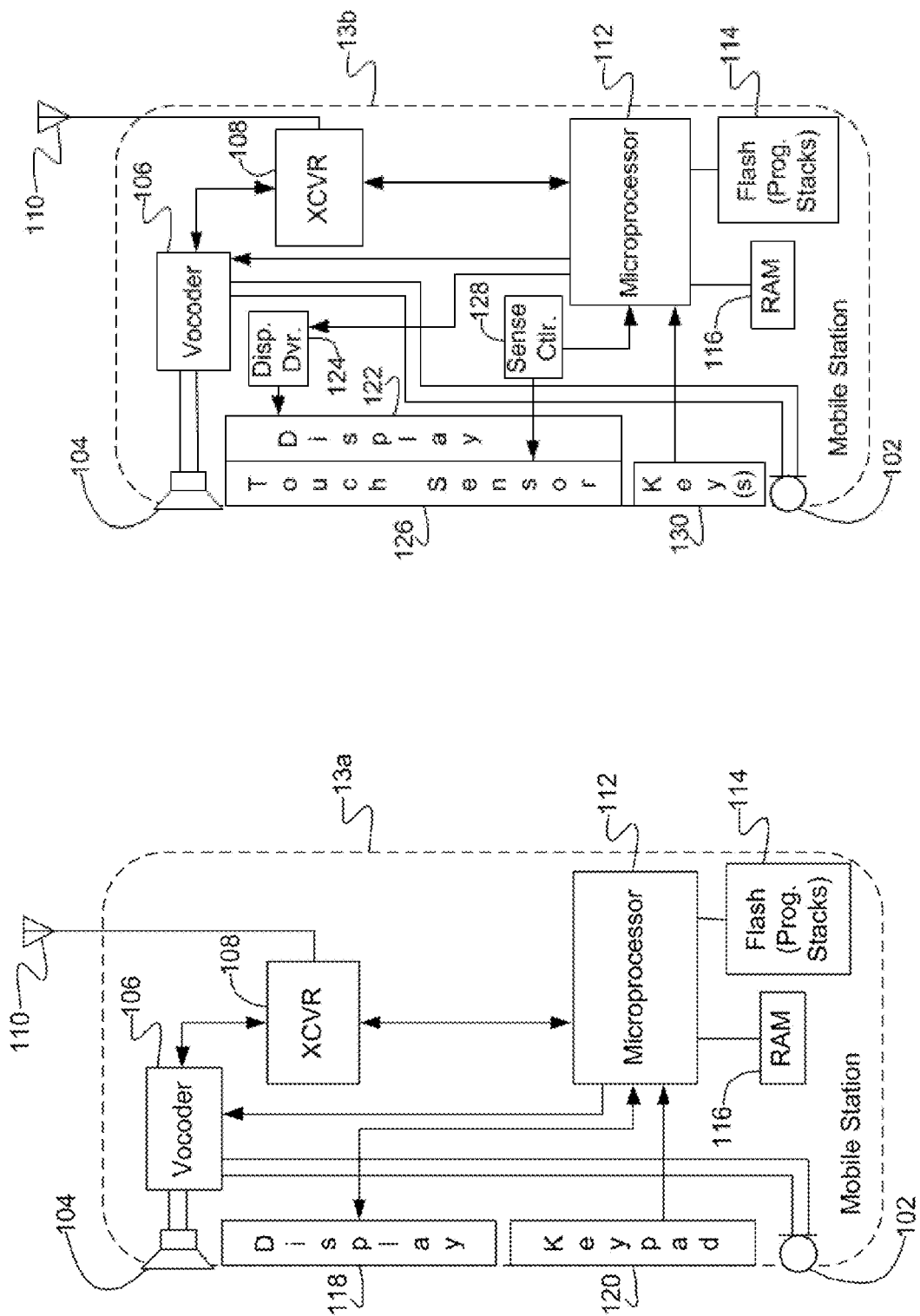

VOICE TO TEXT CONVERSION DURING ACTIVE CALL INCLUDING VOICE

BACKGROUND

Mobile communication services have expanded and increased in popularity around the world. Many advanced networks offer wireless mobile communication service for voice calls, mobile phone messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the communication devices have steadily advanced to take advantage of the new network technologies. The data communication capabilities of the communication devices and the broadband data communication services offered by the networks enable users to perform more and more tasks from their communication devices.

The expanding capabilities of mobile communications devices have allowed the improvement and enhancement of more traditional technologies. Currently available network technologies can enable user devices to communicate with one another using a variety of communication services, such as cellular services, voice over Internet Protocol (voice over IP, VoIP) services, short messaging service (SMS), instant messaging (IM) services and other types of communication services.

For example, user devices can participate in voice call sessions, live in real-time, using currently available network technology. Similar live video call services are available and increasing in popularity. Services like SMS and IM allow users to send and receive text or multimedia messages almost instantaneously (as fast as the network may allow at any given time). If both users are on-line and choose to participate at the same time, the message exchange can be almost real-time communication. The results of the message exchange, however, do not reflect content of a voice communication in a voice or video phone call.

Today, however, there is no existing solution for providing a live (i.e., real-time) transcription of an active voice communication during a call session (voice only call session or video call session with accompanying audio), to a user of a mobile communication device, without an operator.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a high-level functional block diagram of an exemplary non-touch type mobile station as may perform the VTT call transcription service through a network/system like that shown in FIG. 1.

FIG. 2B is a high-level functional block diagram of an exemplary touch screen type mobile station as may perform the VTT call transcription service through a network/system like that shown in FIG. 1.

DETAILED DESCRIPTION OF EXAMPLES

Figure 1:
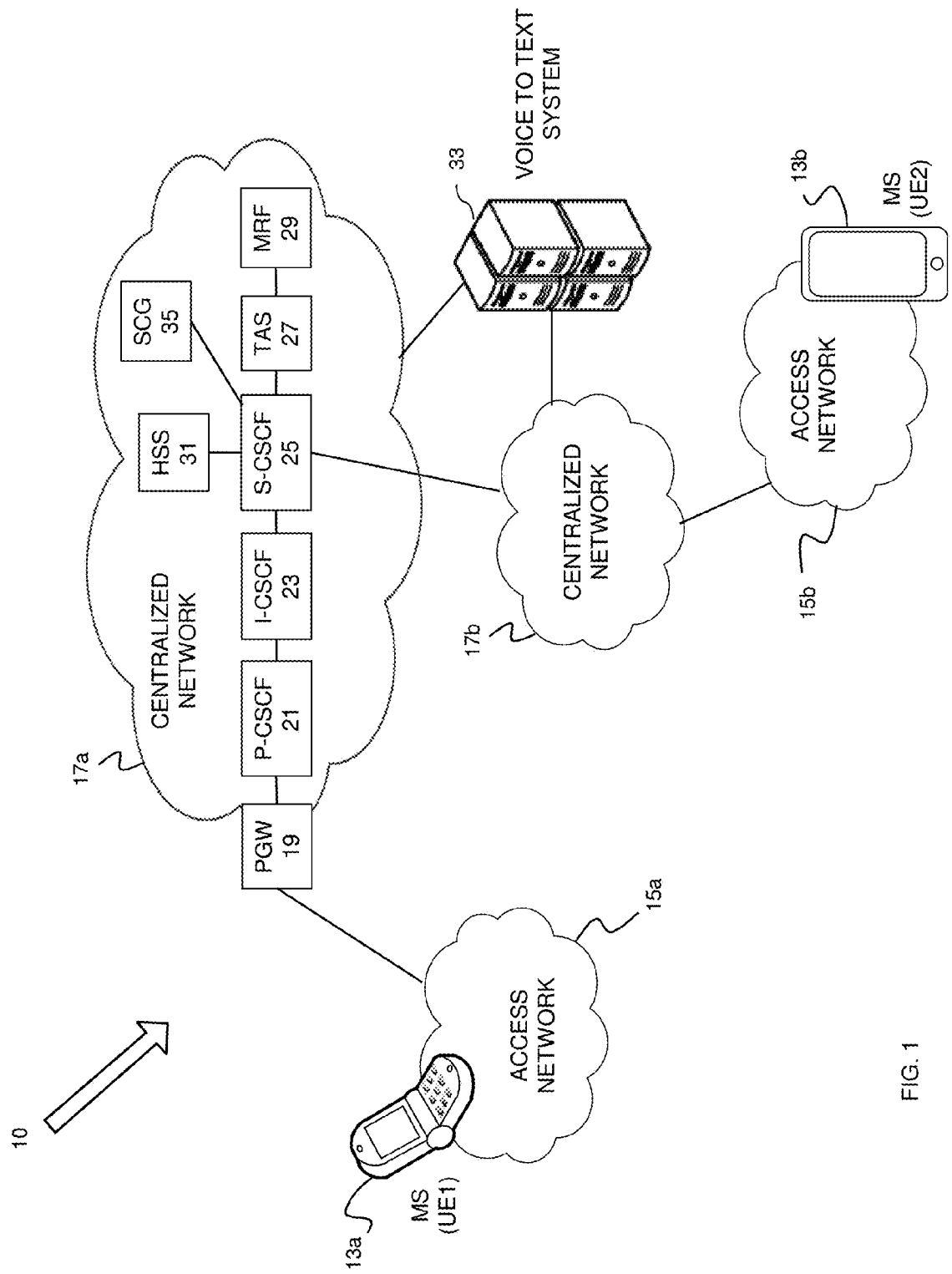
FIG. 1 is a high-level functional block diagram of an example of a system that supports an example of a voice to text (VTT) call transcription service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As above, a need exists to take advantage of existing technology to provide transcription services for active voice call sessions. Current methods use conferencing in of a third party (a live person) to a voice call. This method requires the third party to be on call for the service, and can be costly to maintain. Users may also be hesitant to participate in the service, because of confidentiality concerns.

The various examples disclosed herein relate to VTT call transcription technologies. At least one server receives, through a wireless communication network, a request from a first mobile device to initiate a transcription of a call involving voice communication between the first mobile device and a second mobile device. The call may be a video call, although in the specific examples shown and described in detail, the call is a voice call. Although the specific examples shown describe the second device as a second mobile device, the second device may be any device capable of participating in a call session involving voice communication (e.g., a voice call or a video call), such as a public switched telephone network (PSTN) phone. The server(s), responsive to the request, establishes a bridged communication session over the wireless communication network between the server(s), the first mobile device, the second mobile device and a voice to text (VTT) system. The bridged communication session includes the voice communication exchanged between the first mobile device and the second mobile device. The VTT system is configured to convert the voice communication of the call in the bridged communication session to a text transcription. The VTT system sends, via the wireless communication network, the text transcription of the voice communication of the call, for example, to the first mobile device.

In some examples, the user may provide a request for transcription during an active voice call session and then have a live transcription of the conversation provided to their device from that point forward. In some examples, the transcription request may be automatically indicated with a call placement request. The transcription request may be indicated in each call placed by the user or may be selectively indicated based on information in a subscriber profile. Thus, a live transcription may be automatically generated for a voice call session, based on the user's preferences. For example, the transcription indication may be associated with calls to particular individuals, calls to particular phone numbers associated with particular individuals (e.g., associated with a mobile phone number of a particular individual and not to a land-line phone number of the same individual) to particular types of phone numbers (e.g., 800 service numbers), at a particular time period, a particular day and/or a particular location. In some examples, the VTT call transcription service may receive an indication from the user to end transcription of the voice call, but to continue the voice call.

In some examples, the text transcription of the voice communication of the call is sent to the second device, as well as to the first mobile device. In some examples, the first mobile device instructs the server(s) to send the transcription to the second device (instead of sending the transcription to the first mobile device). In some examples, the called party (e.g., the second device when the first mobile device initiates the call) may request transcription of the voice communication of the call. For example, the transcription request may be indicated in an answer to the call request or may be stored in a profile of the called party. In some examples, a subscriber profile of a user of a mobile device (e.g., the first device or the second device) is stored locally on the mobile device. In some examples, the subscriber profile is stored on one or more servers in the wireless communication network.

In some examples, responsive to receiving the request to initiate the transcription, the server(s) may notify the second device and offer the second device an option to decline participation in the transcription. Accordingly, the bridged communication session may be established when the second device sends an indication to the server(s) agreeing to participate in the transcription service. In some examples, the first mobile device and/or the second device may opt to discontinue the transcription at any point during the bridged communication session.

The example VTT call transcription service may be useful for people who have difficulty hearing (e.g., by providing improved understanding and communication during the voice call). The VTT call transcription service may also provide users with a better experience when calling systems (such as toll-free services) that use an automated menu system. For example, users can view the menu system (via the text transcription) on their mobile device (during the voice call). The text view of the menu system could improve user satisfaction scores for the menu-using service. The example VTT call transcription service may be useful for people who occasionally have a need of a record of a conversation, e.g., in support of particular types of enterprise activities.

Reference now is made in detail to the examples illustrated in the accompanying drawings and discussed below. FIG. 1 illustrates the system architecture of the VTT call transcription service.

FIG. 1 illustrates a system 10 offering a variety of communication services, including communications for wireless voice, video and data by mobile stations (MSs) 13a, 13b of various users. As depicted, system 10 includes MSs 13a and 13b, access networks 15a and 15b, voice to text (VTT) system 33 and centralized networks 17a and 17b. VTT system 33 (also referred to herein as VTT 33), provides real-time voice to text transcription of an active call session including voice communication between two mobile station users (e.g., users of MS 13a and MS 13b). The call session may include a voice call session or a video call session. Centralized networks 17a and 17b each include a packet data network gateway (PGW) 19, a proxy call session control function (Proxy-CSCF, P-CSCF) device 21, an interrogating-CSCF (I-CSCF) device 23, a serving-CSCF (S-CSCF) device 25, a home subscriber server (HSS) 31, a telephony application server (TAS) 27, a media resource function (MRF) 29 and a service continuity gateway (SCG) 35. For brevity, these elements are shown only in centralized network 17a but are also found in centralized network 17b. While FIG. 1 shows a particular number and arrangement of networks and devices, in alternative implementations, system 10 may include additional networks or devices, fewer networks or devices, different networks or devices, or differently arranged networks or devices than those depicted in FIG. 1. Operations performed using the network elements are described below with reference to FIGS. 3A-5B.

Mobile stations 13a, 13b can take the form of portable handsets, smart-phones or personal digital assistants, although they may be implemented in other form factors. In general, mobile stations 13a, 13b may include any device capable of network communications. For example they may include a corded or cordless telephone, a cell-phone, a smart phone, a laptop computer, a tablet computer, a desktop computer or another type of computing or communications device. The example mobile stations 13a, 13b are able to connect to one or more access networks 15a and 15b, which may have the same or different access technologies. Program applications, including an application to assist in the VTT call transcription service can be configured to execute on many different types of mobile stations 13a, 13b. For example, a mobile station application can be written to execute on a binary runtime environment for a mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

Each of the access networks 15a and 15b may include any type of network or combination of networks. Examples include a local area network (LAN), a wireless LAN (WLAN) a wide area network (WAN) a wireless WAN (WWAN) (e.g., a Long Term Evolution (LTE) network), a High-Speed Packet Access (HSPA) network, an Evolved High Rate Packet Data (eHRPD) network a fiber optic network, a metropolitan area network (MAN), an ad hoc network or a telephone network (e.g., a PSTN). Each of the access networks 15a and 15b may be capable of enabling the mobile stations 13a and 13b to communicate with each other or with other devices via the centralized networks 17a and 17b, for a wide variety of voice, video and data services.

The centralized networks 17a and 17b provide routing, session control and application layer control for various communication services through the overall system, including services like voice and video calls that include live real-time exchange of voice between participants. Similar to access networks 15a and 15b, centralized networks 17a and 17b may include any type of network or combination of networks. For instance, each of the centralized networks 17a and 17b may include a LAN, a WLAN, a WAN, or a WWAN. Centralized networks 17a and 17b may include a fiber optic network, a MAN, an ad hoc network, a telephone network, or a voice over Internet protocol (VoIP) network. Each of the centralized networks 17a and 17b may be capable of providing a variety of communication network services, such as registration services, authentication services, authorization services, call session control services, and other types of communication services. In some implementations, centralized networks 17a and 17b include an IP multimedia subsystem (IMS) network or another type of network capable of servicing communication sessions.

The materials that follow describe PGW 19, P-CSCF 21, I-CSCF 23, S-CSCF 25, TAS 27, HSS 31, MRF 29 and SCG 35 with reference to MS 13a, access network 15a and centralized network 17a. This description also applies for the corresponding elements (not shown) in centralized network 17b with reference to MS 13b and access network 15b. While P-CSCF device 21, I-CSCF device 23 and S-CSCF device 25 are depicted as separate devices, in some implementations, the functions of P-CSCF device 21, I-CSCF device 23, and/or S-CSCF device 25 may be implemented in multiple devices or in a single hardware device.

Access network 15a communicates with centralized network 17a through a gateway, for example, PGW 19. The PGW 19 may include a variety of computing or communication devices. For example, PGW 19 may include a router, a switch, a hub, or another device capable of providing connectivity, security, and/or data transfer services between networks. In addition to providing an interface to access network 15a, the example gateway 19 also or alternatively, provides an interface to other networks, such as the Internet. In some implementations, gateway 19 may not be present.

In one implementation, P-CSCF device 21 may include one or more of a variety of computing devices, such as a computer, a server, a cluster of servers, or one or more other types of computing or communication devices. P-CSCF device 21 provides a first point of contact for MS 13a accessing centralized network 17a and provides proxy services for mobile stations that are registered with network 17a. For example, mobile station 13a may attach to P-CSCF device 21 prior to registering with centralized network 17a and/or initiating a communication session.

Similarly, I-CSCF device 23 may include one or more of a variety of computing devices, such as a computer, a server, a cluster of servers, or one or more other types of computing or communication devices. By contrast to P-CSCF device 21 providing proxy services for MS 13a, I-CSCF device 23 provides proxy services for centralized network 17a. For example, during the registration of MS 13a with centralized network 17a, I-CSCF device 23 communicates with HSS 31, using a diameter protocol to provide and obtain profile information for mobile stations accessing network 17a. I-CSCF device 23 assigns or identifies a serving control function (e.g., a function of S-CSCF device 25) for serving MS 13a based on subscriber information retrieved from HSS 31, which may provide for load balancing or other network optimization opportunities within centralized network 17a.

S-CSCF device 25 may also include one or more of a variety of computing devices, including a computer, a server, a cluster of servers, or one or more other types of computing or communication devices. S-CSCF device 25 routes communication messages within centralized network 17a and/or establishes routing paths for session requests and/or communication sessions. S-CSCF device 25 may also, or alternatively, assist in registering MS 13a with centralized network 17a.

SCG 35 may also include one or more of a variety of computing devices, including a computer, a server, a cluster of servers, or one or more other types of computing or communication devices. SCG 35 provides service continuity across different access technologies and communication to S-CSCF 25. SCG 35 determines a radio access network (RAN) used by a subscriber (such as MS 13a) and brokers the transition between session initiation protocol (SIP) signaling and telephony signaling protocols for a telephone network (e.g., a PSTN). SCG 35 remains in the signaling path throughout the call session.

HSS 31 may also include one or more of a variety of computing devices, including a computer, a server, a cluster of servers, or one or more other types of computing or communication devices. HSS 31 provides authentication and authorization services with respect to MS 13a. In an example, HSS 31 operates in a control plane of centralized network 17a and provides a repository of authorizations, service profiles, preferences, and/or policies relating to centralized network 17a. For example, HSS 31 may include identifiers of elements serving MS 13a, such as gateway 19, S-CSCF device 25, and/or one or more other devices when MS 13a is registered.

TAS 27 may also include one or more of a variety of computing devices, including a computer, a server, a cluster of servers, or one or more other types of computing or communication devices. TAS 27 includes a back-to-back session initiation protocol (SIP) user agent capable of maintaining call states. TAS 27 also provides telephony services that are not directly related to routing network messages, including the VTT call transcription service. In some examples, TAS 27 may provide services, such as call waiting, call forwarding, call conferencing, or other types of services relating to telephony services.

MRF 29 may also include one or more of a variety of computing devices, including a computer, a server, a cluster of servers, or one or more other types of computing or communication devices. Although not shown, MRF 29 includes a MRF controller (MRFC) and an MRF processor (MRFP). The MRFC receives signals from an application server and the S-CSCF 25 to control the MRFP. The MRFP provides media-related functions such as voice stream mixing and the playing of tones and announcements. The MRFP may also manage access rights to shared resources. For example, the MRFP may allow audio streams from two or more UE devices to be mixed to implement a conference call feature.

As described below with reference to FIGS. 3A-5B, MRF 29 establishes a conference call among itself, MS 13a (also referred to herein as first user equipment 13a or UE1 13a), MS 13b (also referred to herein as second user equipment or UE2 13b) and VTT system 33 using PGW 19, P-CSCF device 21, S-CSCF 25 and TAS 27 of each of centralized networks 17a and 17b.

VTT 33 includes one or more of a variety of computing devices, including a computer, a server, a cluster of servers, or one or more other types of computing or communication devices. VTT 33 receives one or more voice signals (e.g., a voice signal from first MS 13a and/or a voice signal from second MS 13b) and provides real-time voice to text transcription of each voice signal (for example, to provide a transcription of a conversation between first MS 13a and second MS 13b). VTT 33 may include any device or devices configured to provide voice to text processing of voice signals. VTT 33 may use any known speech to text conversion techniques, such as, and without being limited to, acoustic modeling and/or language modeling, including Hidden Markov models (HMMs) and neural networks. VTT 33 receives voice signal(s) and provides corresponding converted text via a transcription session (established by TAS 27 and MRF 29). The transcription session may be established between first MS 13a and VTT 33 or may be established in a bridged communication session between first MS 13a, second MS 13b and VTT 33. The transcription sessions are described further below with respect to FIGS. 3A, 3B and 4B.

For purposes of further discussion, we will focus on functions in support of the VTT call transcription service. In one example, user A of first mobile station 13a (i.e., UE1) desires to initiate a VTT call transcription service with user B of second mobile station 13b (i.e., UE2). When a VTT call transcription is initiated, as described in further detail below in relation to FIGS. 3A and 3B, a transcription session is established between first MS 13a and VTT 33, via TAS 27 and MRF 29. The transcription session (between MS 13a and VTT 33) and a pending call session including voice communication (between first MS 13a and second MS 13b) are placed on hold while a bridged communication (call and transcription) session is established between first MS 13a, second MS 13b and VTT 33, via TAS 27 and MRF 29. The on-hold transcription session (between first MS 13a and VTT 33) and the on-hold call session (between first MS 13a and second MS 13b) are each terminated in response to first MS 13a, second MS 13b and VTT 33 joining the bridged session. Once the bridged session is established, first MS 13a receives a real-time or near real-time text transcription of the voice communication of the call between first MS 13a and second MS 13b.

In some examples, the VTT call transcription service may be initiated by first MS 13a during a pending call session between first MS 13a and second MS 13b, such as on a per call basis (described further below with respect to FIG. 3A). For example, user A of first MS 13a may provide an indication to initiate the VTT call transcription service during a pending call session between first MS 13a and second MS 13b or at the start of the call session.

In some examples, the VTT call transcription service may be initiated automatically by first MS 13a (described further below with respect to FIG. 3B). For example, first MS 13a may store an indication to automatically initiate the VTT call transcription service for each call placed by first MS 13a. In other examples, the indication to initiate the VTT call transcription service may be associated with particular individuals (such as particular individuals stored in an address book), with particular types of phone numbers (e.g., 800 service numbers), with a particular time period (e.g., from 5 pm to 6 pm), for particular days of the week (e.g., Mondays and Wednesdays), at particular dates and/or for particular locations (e.g., when the first MS 13a is located in a particular coffee shop). In some examples, the indication for VTT call transcription may be stored in a subscriber profile associated with user A of first MS 13a.

Although the specific examples describe a two-party call scenario, this is just an example of the VTT call transcription service. In general, The VTT call transcription may be added as a service on a call between two or more parties (such as a conference call involving three or more parties).

The VTT call transcription service under consideration here may be provided on calls involving touch screen type mobile devices as well as on calls to or from non-touch type mobile stations. Hence, our simple example shows mobile station 13a as a non-touch screen type mobile station and mobile station 13b as a touch type mobile station. Implementation of the VTT call transcription procedure will involve at least some execution of programming in the mobile stations as well as implementation of user input/output functions and data communications through the networks 17a and 17b, from the mobile stations. It may be useful to consider the functional elements/aspects of examples of two types of mobile stations 13a, 13b, at a high-level.

For purposes of such discussion, FIG. 2A provides a block diagram illustration of an example of a non-touch type mobile station 13a. Either or both of the mobile stations 13a, 13b of FIG. 1 may be implemented as a non-touch mobile station as shown at 13a in FIG. 2A. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, including a call involving VTT service, the vocoder 106 provides two-way conversion between analog audio signals representing speech or other audio and digital samples at a compressed bit rate compatible with the digital protocol of wireless telephone network communications or voice over packet (Internet Protocol) communications. The microphone 102 supplies the digital representation of the audio signal to the microprocessor 112, which stores the representation as an audio file in one of the device memories.

For digital wireless communications, including wireless data communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network (e.g., network 17a, network 17b). The transceiver 108 also sends and receives a variety of signaling messages in support of the various voice and data services provided via the mobile device 13a and the communication network. Each transceiver 108 connects through radio frequency (RF) send and receive amplifiers (not separately shown) to an antenna 110. The transceiver 108 may also support various types of mobile messaging services, such as short message service (SMS), enhanced messaging service (EMS) and/or multimedia messaging service (MMS). In some examples, SMS messaging may be used to support the VTT call transcription procedure. For example, MRF 29 or VTT 33 may send the audio transcription to mobile device 13*a* as one or more SMS messages including the transcribed data.

The mobile device 13*a* includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones. In addition to normal telephone and data related input/output (including message input and message display functions), the user interface elements also may be used for display of menus and other information to the user and user input of selections (such as for functions relating to the VTT call transcription procedure).

A microprocessor 112 is a programmable hardware circuit that serves as a programmable controller for the mobile station 13*a*, in that it controls all operations of the mobile station 13*a* in accord with programming that it executes, for all normal operations, and for operations involved in the VTT call transcription procedure under consideration here. In the example, the mobile station 13*a* includes flash type program memory 114, for storage of various "software" or "firmware" program routines and mobile configuration settings, such as a mobile directory number (MDN) and/or a mobile identification number (MIN), etc. The mobile station 13*a* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, application programming interface(s) (APIs), call processing software, and vocoder control software, and any of a wide variety of other applications, such as client browser software and short message service software, any of which may operate with active user intervention or in the background without user intervention. The APIs include VTT call transcription functionality for requesting voice communication transcription and delivering transcribed voice communication of calls (e.g., in real time synchronous with the active voice communication of the call). In some examples, a VTT call transcription application may be downloaded to mobile device 13*a* and used for VTT call transcription. For example, a VTT call transcription application may be downloaded by a mobile device (such as mobile device 13*a*) that supports video calling but does not have the capability to update the user interface to include a VTT call transcription API. The memories 114, 116 also store various data, such as a subscriber profile, telephone numbers and server addresses, downloaded data such as multimedia content, call transcriptions and various data input by the user. In some examples, memories 114, 116 also store transcribed voice communications. Programming stored in the flash type program memory 114, sometimes referred to as "firmware," is loaded into and executed by the microprocessor 112.

As outlined above, the mobile station 13*a* includes a processor 112, and programming stored in the flash memory 114 configures the processor so that the mobile station is capable of performing various desired functions, including in this case the functions involved in the technique for transcribing voice communication of calls between mobile stations 13*a* and 13*b* using VTT 33.

FIG. 2B is a block diagram illustration of an example of a touch screen type mobile station 13*b*. Either or both of the mobile station 13*a*, 13*b* of FIG. 1 may be implemented as a touch screen mobile station as shown at 13*b* in FIG. 2B. Although possibly configured somewhat differently, at least logically, a number of the elements of the touch screen type mobile station 13*b* are similar to the elements of mobile station 13*a*, and are identified by like reference numbers in FIG. 2B. For example, the touch screen type mobile station 13*b* includes microphone 102, speaker 104 and vocoder 106, for audio input and output functions, much like in the earlier example. The mobile station 13*b* also includes at least one digital transceiver (XCVR) 108, for digital wireless communications, although the handset 13*b* may include an additional digital or analog transceiver. The concepts discussed here encompass embodiments of the mobile station 13*b* utilizing any digital transceivers that conform to current or future developed digital wireless communication standards. As in the mobile station 13*a*, the transceiver 108 provides two-way wireless communication of information, such as vocoded speech samples and/or digital information, in accordance with the technology of the network (e.g., network 17*a* or 17*b*). The transceiver 108 also sends and receives a variety of signaling messages in support of the various voice and data services provided via the mobile station 13*b* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS). In some examples, SMS messaging may be used to support the VTT call transcription procedure. For example, MRF 29 or VTT 33 may send the audio transcription to mobile device 13*b* as one or more SMS messages including the transcribed data.

As in the example of mobile station 13*a*, a microprocessor 112 serves as a programmable controller for the mobile station 13*b*, in that it controls all operations of the mobile station 13*b* in accord with programming that it executes, for all normal operations, and for operations involved in the VTT call transcription procedure under consideration here. In the example, the mobile station 13*b* includes flash type program memory 114, for storage of various program routines and mobile configuration settings. The mobile station 13*b* may also include a non-volatile random access memory (RAM) 116 for a working data processing memory. Of course, other storage devices or configurations may be added to or substituted for those in the example. Similar to the implementation of mobile station 13*a*, the flash type program memory 114 stores firmware such as a boot routine, device driver software, an operating system, API(s), call processing software, and vocoder control software, and any of a wide variety of other applications, such as client browser software and short message service software, any of which may operate with active user intervention or in the background without user intervention. The APIs include VTT call transcription functionality for requesting call transcription and delivering transcribed voice communication of calls (e.g., in real time synchronous with active voice communication of the call). In some examples, a VTT call transcription application may be downloaded to mobile device 13b and used for VTT call transcription. For example, a VTT call transcription application may be downloaded by a mobile device (such as mobile device 13b) that supports video calling but does not have the capability to update the user interface to include a VTT call transcription API. As with the mobile device 13a, the memories 114, 116 also store various data, including transcribed voice communications and a subscriber profile.

Hence, as outlined above, the mobile station 13b includes a processor, and programming stored in the flash memory 114 configures the processor so that the mobile station 13b is capable of performing various desired functions, including in this case the functions involved in the technique for transcribing voice communication of calls between mobile stations 13a and 13b using VTT 33.

In the example of FIG. 2A, the user interface elements included a display and a keypad. The mobile station 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile station 13b in our example includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to call related functions.

The structure and operation of the mobile station 13a and 13b, as outlined above, were described to by way of example, only.

Figure 3A:
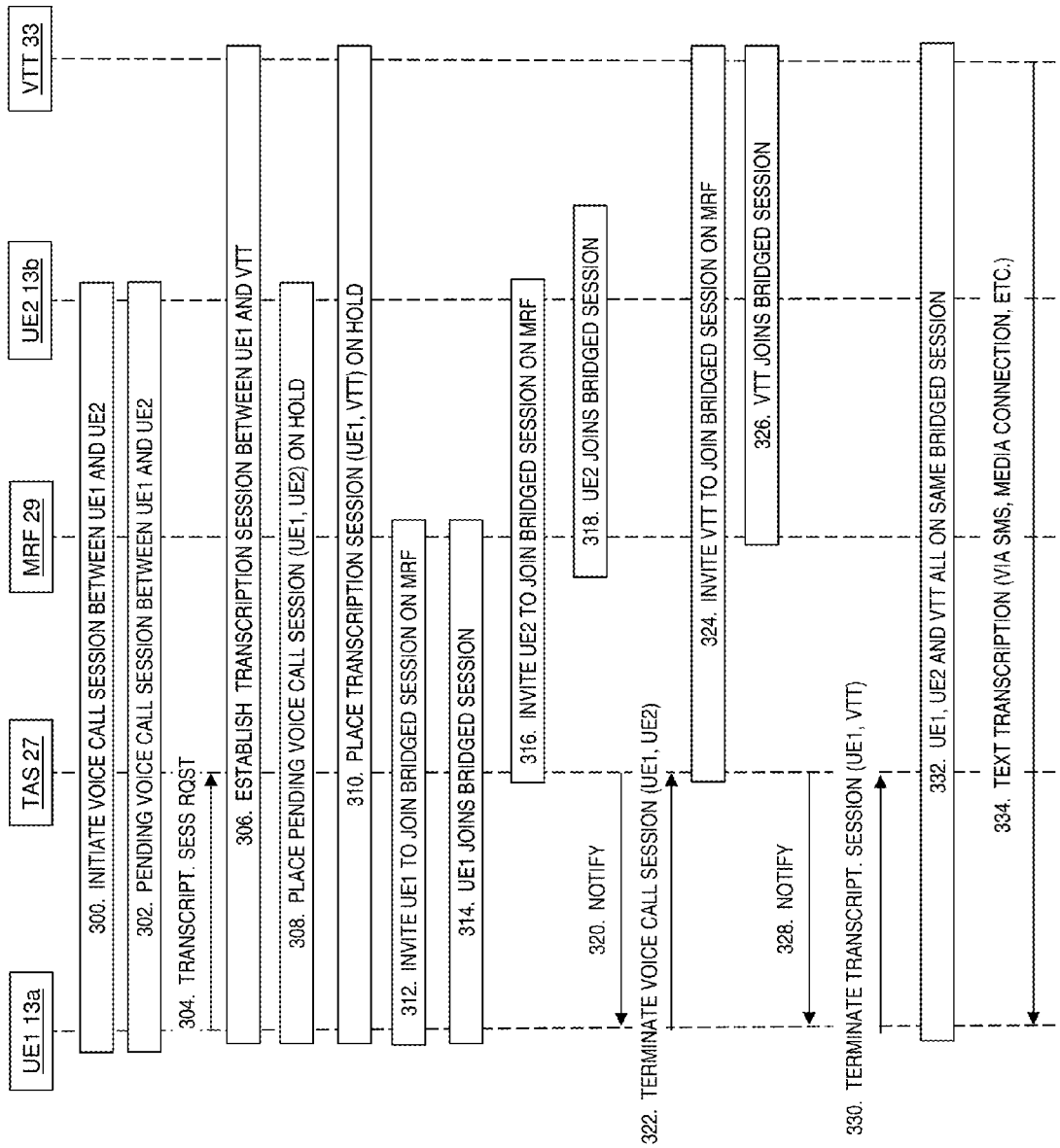
FIG. 3A is a signal flow diagram illustrating an example of establishing a bridged communication session between first and second mobile stations and a VTT system responsive to a transcription session request.
Figure 3B:
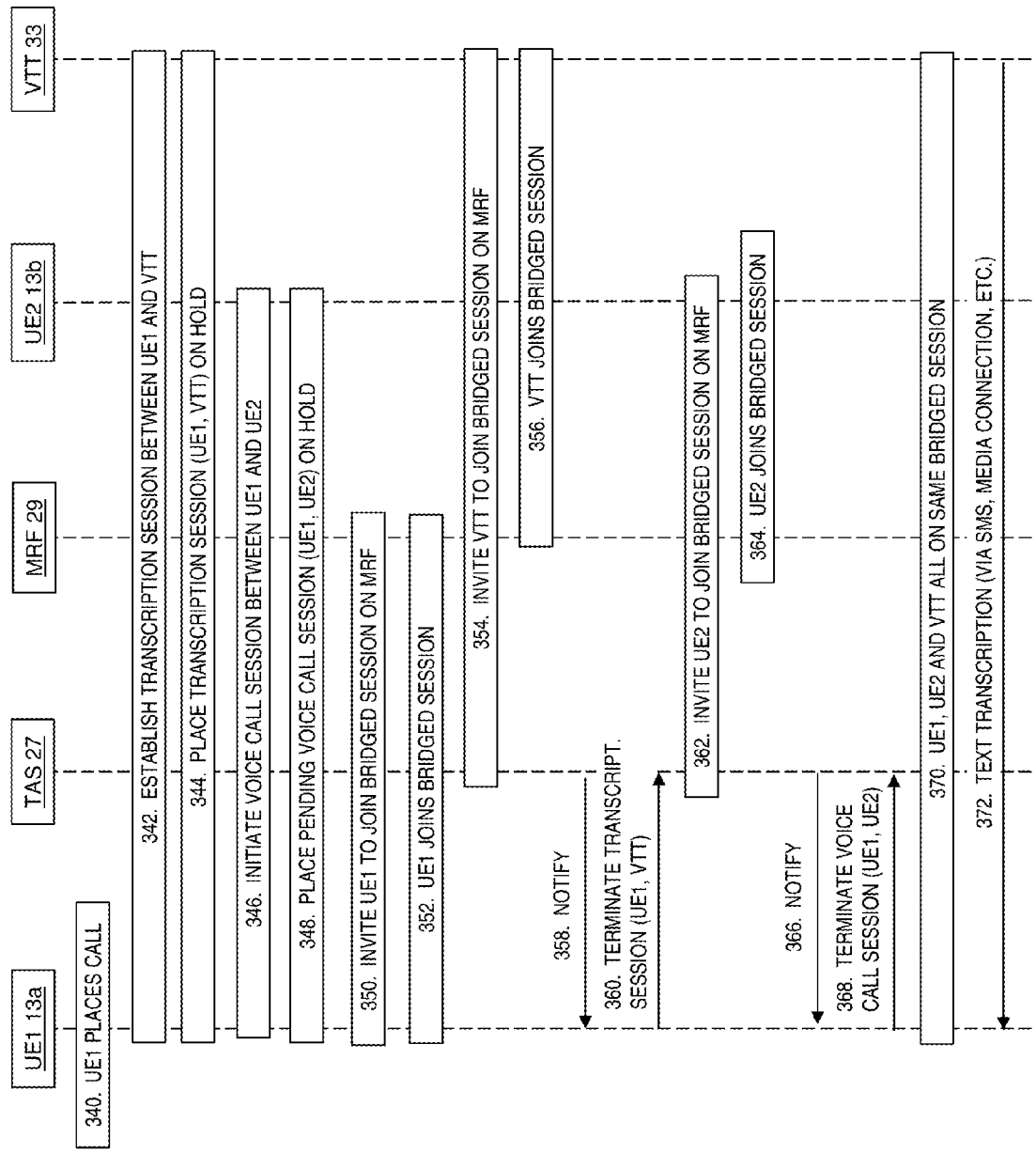
FIG. 3B is a signal flow diagram illustrating an example of automatically establishing a bridged communication session between the first and second mobile stations and the VTT system.

FIGS. 3A and 3B are signal flow diagrams illustrating examples of establishing a bridged communication session (for a call including voice communication and transcription) between first UE 13a, second UE 13b and VTT 33. In particular, FIG. 3A illustrates the establishment of the bridged communication session responsive to a transcription session request from user A of first UE 13a (i.e., a per use transcription request); and FIG. 3B illustrates automatic establishment of the bridged communication session. In FIGS. 3A and 3B, the signal flow includes an interaction between the first UE 13a, second UE 13b, TAS 27 (of centralized network 17a), MRF 29 (of centralized network 17a) and VTT 33. These applications were described in detail with respect to FIGS. 1, 2A and 2B. Therefore, for the sake of brevity, they are not described here in more detail. Although not shown in FIGS. 3A and 3B, the signal flow may also include interaction with PGW 19, P-CSCF 21, S-CSCF 25, HSS 31 and/or SCG 35 of centralized network 17a and/or centralized network 17b (FIG. 1).

Referring to FIG. 3A, the process for per use transcription request begins at step 300, with initiating a call session including voice communication between first UE 13a and second UE 13b (described further below with respect to FIG. 4A). Responsive to the initiation (step 300), at step 302, a pending call session is established between first UE 13a and second UE 13b.

Figure 6C:
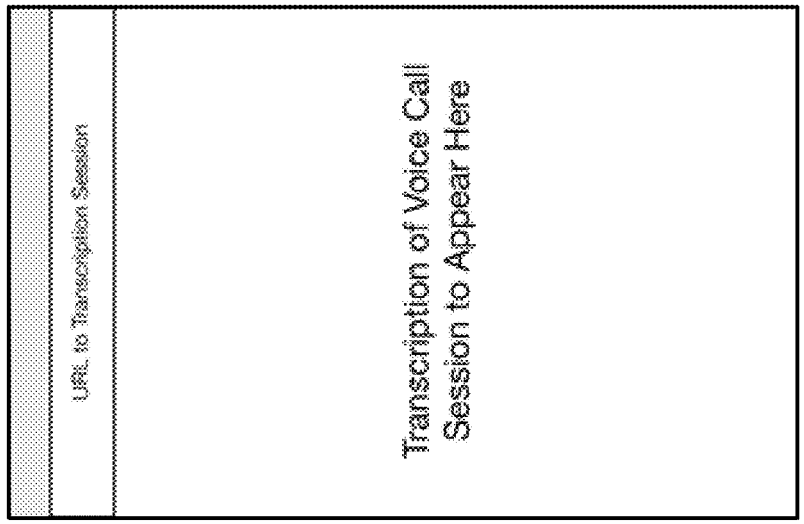
FIGS. 6A, 6B and 6C are example VTT transcription session screens that may be displayed on a mobile station, during a VTT call transcription session.
Figure 6B:
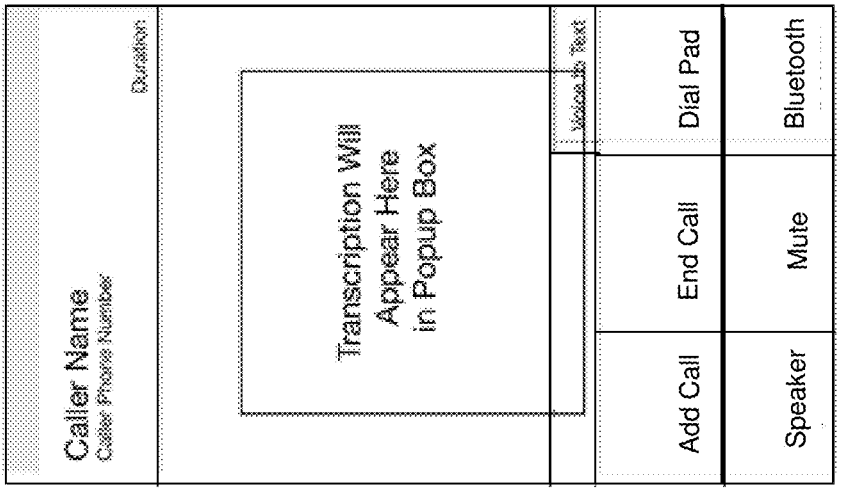
Figure 6A:
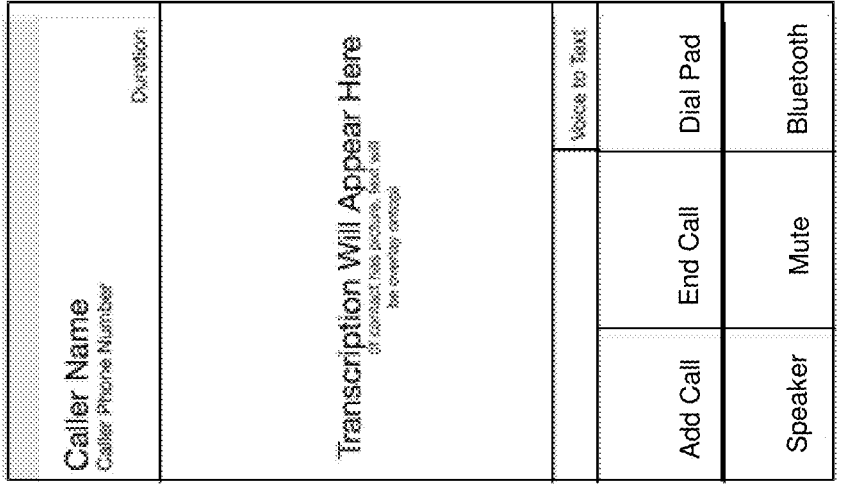

At step 304 a transcription session request is sent from first UE 13a to TAS 27, to initiate a VTT call transcription session with second UE 13b. For example, user A of first UE 13a may use a suitable call and transcription screen on first UE 13a to initiate the request (such as shown in FIG. 6A). Responsive to the user indication, first UE 13a may generate and send the transcription session request to TAS 27.

At step 306, responsive to the transcription session request received by TAS 27 (at step 304), a transcription session is established between first UE 13a and VTT 33 (described further below with respect to FIG. 4B). In some examples, responsive to receiving the request to initiate the transcription, TAS 27 may notify the second UE 13b and offer second UE 13b an option to decline participation in the transcription. Accordingly, the transcription session may be established when second UE 13b sends an indication to TAS 27 agreeing to participate in the transcription service. In some examples, the notification to UE 13b may be sent via an email or a text message. At step 308, responsive to the established transcription session (between first UE 13a and VTT 33, at step 304), the pending call session (between first UE 13a and second UE 13b in step 302) is placed on hold (described further below with respect to FIG. 4C). At step 310, the pending transcription session (between first UE 13a and VTT 33 in step 306) is placed on hold (described further below with respect to FIG. 4D).

At step 312, responsive to the pending call and transcription sessions being on hold (respective steps 308 and 310), first UE 13a is invited to join a bridged communication (transcription and call) session on MRF 29. At step 314, responsive to the invitation (step 312), first UE 13a joins the bridged session. For example, at step 312, first UE 13a sends an INVITE message to MRF 29 (e.g., via P-CSCF 21, S-CSCF 25 and TAS 27) to join the bridged session. MRF 29 sends an OK message to first UE 13a (e.g., via TAS 27, S-CSCF 25 and P-CSCF 21), responsive to the INVITE message (from first UE 13a). At step 314, first UE 13a may join the bridged session responsive to receiving the OK message from MRF 29, and any further session setup.

At step 316, responsive to UE1 joining the bridged session (step 314), second UE 13b is invited to join the bridged session on MRF 29. At step 318, responsive to the invitation (step 316), second UE 13b joins first UE1 13a on the bridged session. For example, at step 316, first UE 13a sends a REFER message to TAS 27 (e.g., via P-CSCF 21 and S-CSCF 25) for second UE 13b, for a call transfer to the bridged session. Responsive to the REFER message, TAS 27 sends an INVITE message to second UE 13b (via MRF 29) to join the bridged session. Responsive to an OK message from second UE 13b and any further session setup, second UE 13b joins the bridged session (at step 318).

At step 320, TAS 27 notifies first UE 13a (e.g., via S-CSCF 25 and P-CSCF 21) that second UE 13b has joined the bridged session. At step 322, responsive to the notification in step 320, first UE 13a sends a BYE message to TAS 27 (e.g., via P-CSCF 21 and S-CSCF 25) to terminate the call session between first UE 13a and second UE 13b (on hold in step 308). Responsive to the BYE message from first UE 13a, TAS 27 terminates the on-hold call session.

At step 324, responsive to second UE 13b joining the bridged session (step 318) and the call session being terminated (step 322), VTT 33 is invited to join the bridged session on MRF 29. At step 326, responsive to the invitation (step 324), VTT 33 joins the bridged session. For example, at step 324, first UE 13a sends a REFER message to TAS 27 (e.g., via P-CSCF 21 and S-CSCF 25) for VTT 33 for a call transfer to the bridged session. Responsive to the REFER message, TAS 27 sends an INVITE message to VTT 33 (via MRF 29) to join the bridged session. Responsive to an OK message from VTT 33 and any further session setup, VTT 33 joins the bridged session (at step 326).

At step 328, TAS 27 notifies first UE 13a (e.g., via S-CSCF 25 and P-CSCF 21) that VTT 33 has joined the bridged session. At step 330, responsive to the notification in step 328, first UE 13a sends a BYE message to TAS 27 (e.g., via P-CSCF 21 and S-CSCF 25) to terminate the transcription session between first UE 13a and VTT 33 (on hold in step 310). Responsive to the BYE message from first UE 13a, TAS 27 terminates the on-hold transcription session.

At step 332, first UE 13a, second UE 13b and VTT 33 are all on the same bridged communication (transcription and call) session (and the previously on-hold call and transcription sessions have been terminated). At step 334, VTT 33 sends a text transcription of the voice conversation between first UE 13a and second UE 13b to first UE 13a. For example, the text transcription may be presented on a display of first UE 13a, such as in a popup box (as shown in FIG. 6B), or directly on the display screen (as shown in FIG. 6C). The transcription text may be sent to first UE 13a as a text stream, via any suitable messaging service (e.g., SMS messaging, EMS messaging, MMS messaging), web-based (i.e., hypertext transfer protocol (HTTP)-based) service and/or media connection (such as an additional data stream via MRF 29).

Referring to FIG. 3B, the process for an automatic transcription request begins at step 340, with first UE 13a placing a call request to second UE 13b. At step 340, first UE 13a determines that the call is associated with a transcription indication. For example, first UE 13a identifies a transcription request associated with the call request, based on a subscriber profile of user A of first UE 13a. As discussed above, the indication may be associated with all call requests placed by first UE 13a or for one or more of calls to particular individuals, to particular types of phone numbers, at a particular time period, a particular day and/or a particular location.

At step 342, responsive to the identified transcription indication in the call request (at step 340), a transcription session is established between first UE 13a and VTT 33 (described further below with respect to FIG. 4B). In some examples, responsive to the identified transcription indication in the call request, TAS 27 may notify the second UE 13b and offer second UE 13b an option to decline participation in the transcription. Accordingly, the transcription session may be established when second UE 13b sends an indication to TAS 27 agreeing to participate in the transcription service. In some examples, a user of first UE 13a may be notified that the call request is associated with transcription, to provide first UE 13a with the option to decline automatic transcription of the call. In some examples, the notification to UE 13a and/or UE 13b may be sent via an email or a text message, before the transcription session (and voice call session) is established. At step 344, the pending transcription session (between first UE 13a and VTT 33 in step 342) is placed on hold (described further below with respect to FIG. 4D).

At step 346, a call session including voice communication is initiated between first UE 13a and second UE 13b (described further below with respect to FIG. 4A), responsive to the transcription session (step 344) being placed on hold. At step 348, the initiated call session (between first UE 13a and second UE 13b at step 346) is placed on hold (described further below with respect to FIG. 4C).

At step 350, responsive to the pending transcription and call sessions being placed on hold (respective steps 344 and 348), first UE 13a is invited to join a bridged communication (transcription and call) session on MRF 29. At step 352, responsive to the invitation (step 350), first UE 13a joins the bridged session. Steps 350 and 352 are similar to steps 312 and 314 of FIG. 3A, described above.

At step 354, responsive to first UE 13a joining the bridged session (step 352), VTT 33 is invited to join the bridged session on MRF 29. At step 356, responsive to the invitation (step 354), VTT 33 joins the bridged session. Steps 354 and 356 are similar to steps 324 and 326 of FIG. 3A, described above.

At step 358, TAS 27 notifies first UE 13a (e.g., via S-CSCF 25 and P-CSCF 21) that VTT 33 has joined the bridged session. At step 360, responsive to the notification in step 358, first UE 13a sends a BYE message to TAS 27 (e.g., via P-CSCF 21 and S-CSCF 25) to terminate the transcription session between first UE 13a and VTT 33 (on hold in step 344). Responsive to the BYE message from first UE 13a, TAS 27 terminates the on-hold transcription session.

At step 362, responsive to VTT 33 joining the bridged session (step 356), second UE 13b is invited to join the bridged session on MRF 29. At step 364, responsive to the invitation (step 362), second UE 13b joins first UE 13a on the bridged session. Steps 362 and 364 are similar to steps 316 and 318 of FIG. 3A, described above.

At step 366, TAS 27 notifies first UE 13a (e.g., via S-CSCF 25 and P-CSCF 21) that second UE 13b has joined the bridged session. At step 368, responsive to the notification in step 366, first UE 13a sends a BYE message to TAS 27 (e.g., via P-CSCF 21 and S-CSCF 25) to terminate the call session between first UE 13a and second UE 13b (on hold in step 348). Responsive to the BYE message from first UE 13a, TAS 27 terminates the on-hold call session.

At step 370, first UE 13a, second UE 13b and VTT 33 are all on the same bridged communication session (and the previously on-hold call and transcription sessions have been terminated). At step 372, VTT 33 sends a text transcription of the voice conversation between first UE 13a and second UE 13b to first UE 13a, similar to step 334 in FIG. 3A. For example, the text transcription may be presented as a display of first UE 13a, such as in a popup box (as shown in FIG. 6B), or directly on the display screen (as shown in FIG. 6C).

Figure 4A:
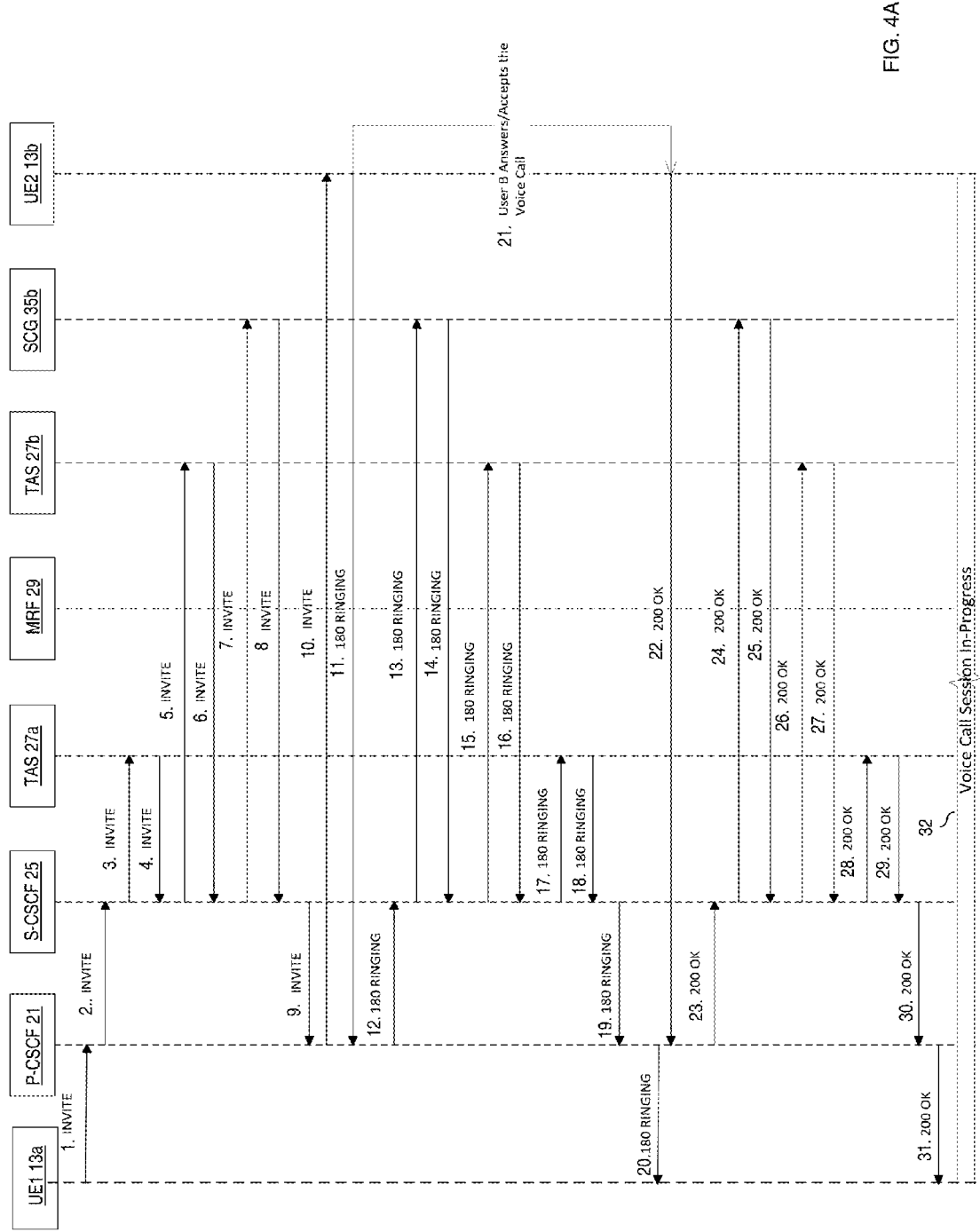
FIG. 4A is a signal flow diagram illustrating an example of initiating a voice call session between the first and second mobile stations.

FIG. 4A is a signal flow diagram illustrating an example of initiating a voice call session between first UE 13a and second UE 13b (steps 300 and 346 in respective FIGS. 3A and 3B). The voice call session is an example of the call session described in FIGS. 3A and 3B. In FIG. 4A, the signal flow may include an interaction between first UE 13a, second UE 13b, centralized network 17a components (P-CSCF 21, S-CSCF 25, TAS 27a, MRF 29) and centralized network 17b components (TAS 27b and SCG 35b).

At steps 1-10, a session initiation protocol (SIP) INVITE message is sent from first UE 13a to second UE 13b, via P-CSCF 21, S-CSCF 25, TAS 27a, TAS 27b and SCG 35b. The INVITE message indicates that the second UE 13b is being invited to participate in the voice call session.

At steps 11-20, a SIP 180 RINGING response is sent from second UE 13b to first UE 13a, via P-CSCF 21, S-CSCF 25, TAS 27a, TAS 27b and SCG 35b. The 180 RINGING response indicates that second UE 13b received the INVITE message and is alerting user B of second UE 13b of the requested session.

At step 21, responsive to the INVITE message, user B of second UE 13b answers (i.e., accepts) the voice call. For example, second UE 13b may receive an indication from user B via a user interface (such as keypad 120 in FIG. 2A or display 122 in FIG. 2B) that the user B has accepted the voice call.

At steps 22-31, responsive to the voice call being accepted (step 21), a SIP 200 OK response is sent from second UE 13b to first UE 13a, via P-CSCF 21, S-CSCF 25, TAS 27a, TAS 27b and SCG 35b. The 200 OK response indicates that the request (in steps 1-10) was successful.

At step 32, responsive to first UE 13a receiving the 200 OK response (step 31), the voice call session between first UE 13a and second UE 13b is initiated.

Figure 4B:
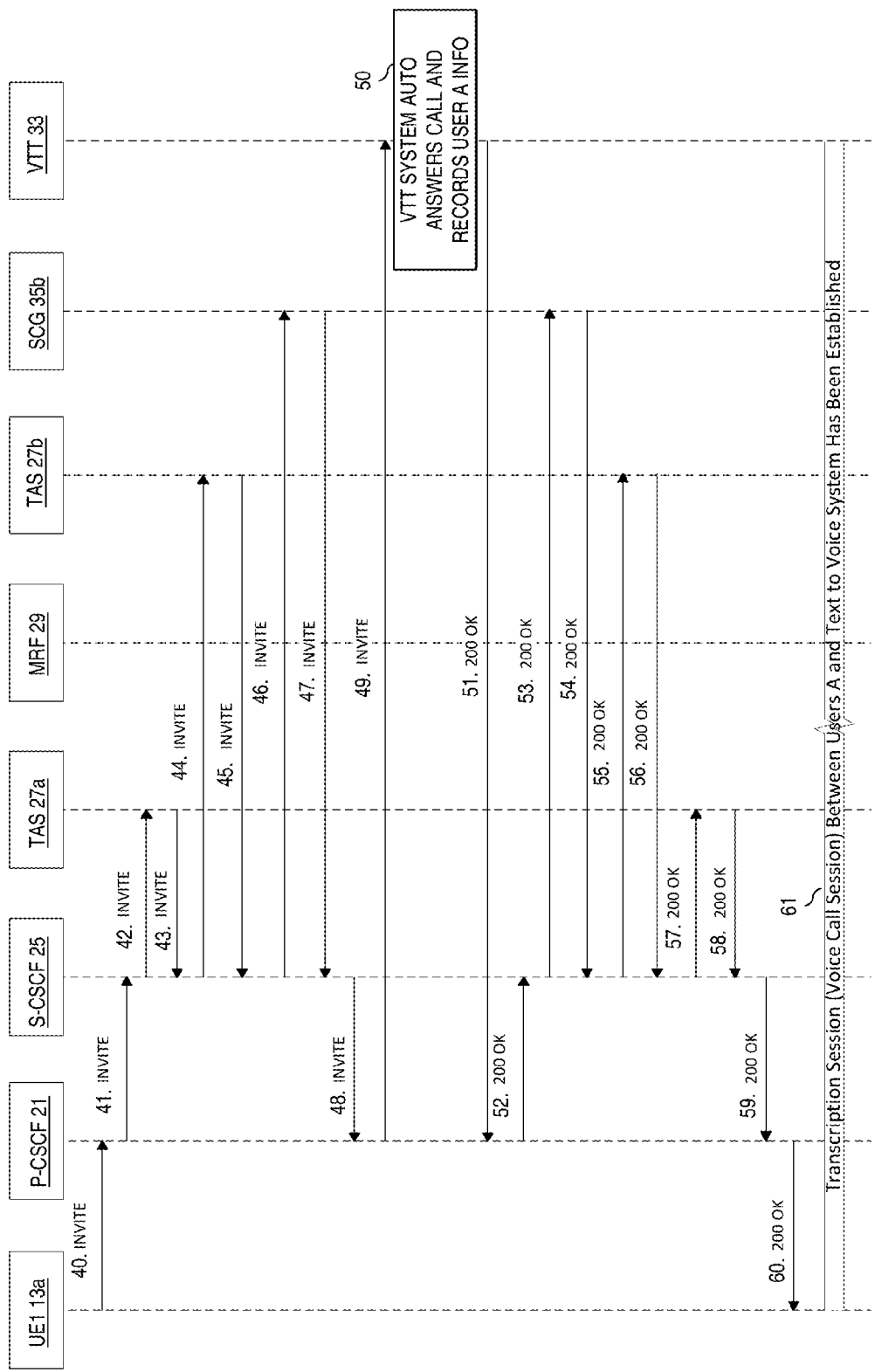
FIG. 4B is a signal flow diagram illustrating an example of establishing a transcription session between the first mobile station and the VTT system.

FIG. 4B is a signal flow diagram illustrating an example of establishing a transcription session between first UE 13a and VTT 33 (steps 306 and 342 in respective FIGS. 3A and 3B). In FIG. 4B, the signal flow may include an interaction between first UE 13a, VTT 33, centralized network 17a components (P-CSCF 21, S-CSCF 25, TAS 27a, MRF 29) and centralized network 17b components (TAS 27b and SCG 35b).

At steps 40-49, an INVITE message is sent from first UE 13a to VTT 33, via P-CSCF 21, S-CSCF 25, TAS 27a, TAS 27b and SCG 35b. The INVITE message indicates that VTT 33 is being invited to participate in the transcription session.

At step 50, responsive to the INVITE message, VTT 33 automatically answers (i.e., accepts) the call and records information associated with user A (of first UE 13a). For example, VTT 33 records an address of first UE 13a for sending a text transcription. The address may be indicated in the "FROM" header/field of the SIP Invite message. The address may include, for example, a phone number or an email address.

At steps 51-60, responsive to the call being answered (step 50), a 200 OK response is sent from VTT 33 to first UE 13a, via P-CSCF 21, S-CSCF 25, TAS 27a, TAS 27b and SCG 35b. The 200 OK response indicates that the request (in steps 40-49) was successful.

At step 61, responsive to first UE 13a receiving the 200 OK response (step 60), the transcription (call) session between first UE 13a and VTT 33 is initiated.

Figure 4C:
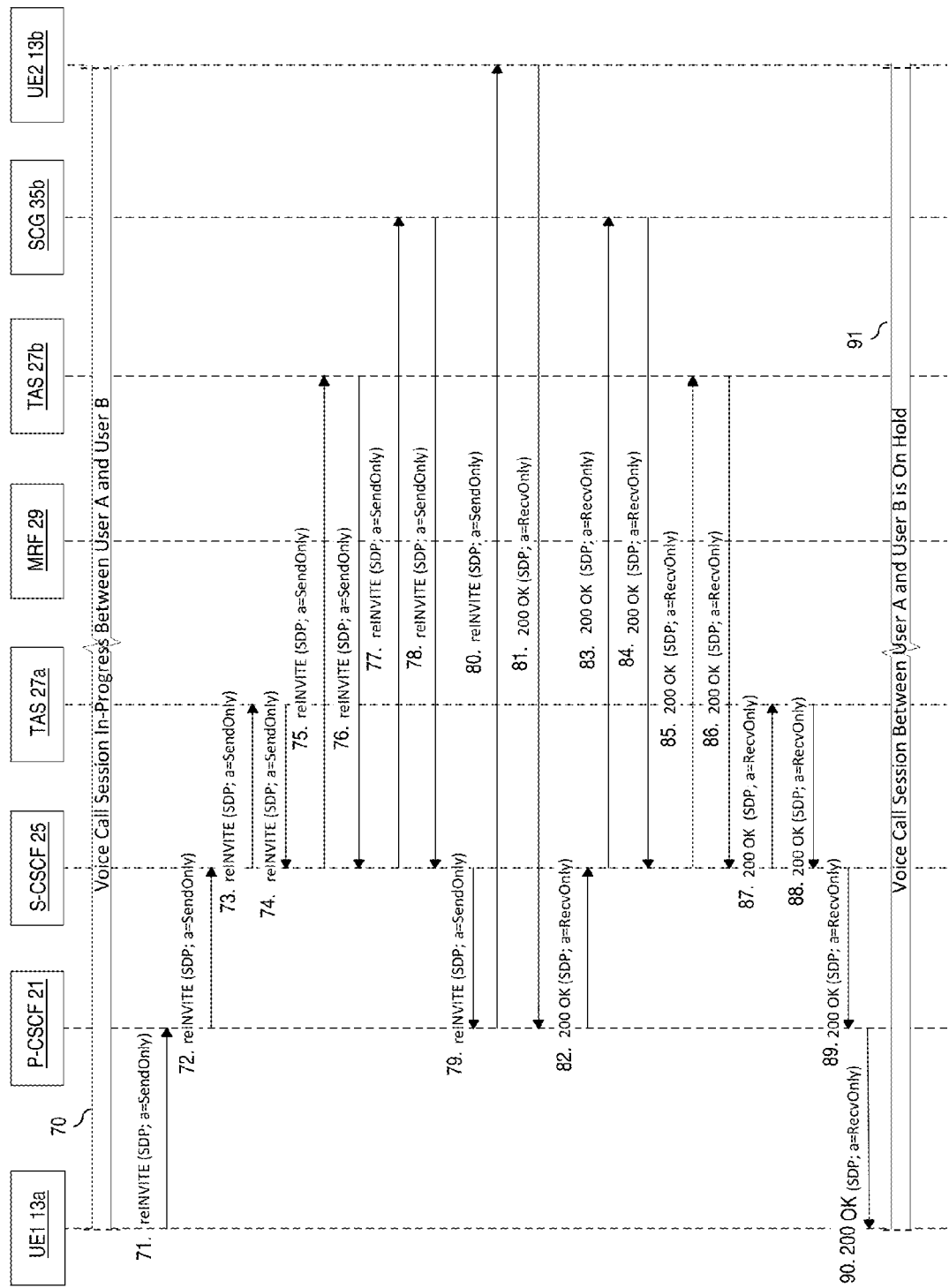
FIG. 4C is a signal flow diagram illustrating an example of placing the voice call session between the first and second mobile stations on hold.

FIG. 4C is a signal flow diagram illustrating an example of placing a voice call session between first UE 13a and second UE 13b on hold (steps 308 and 348 in respective FIGS. 3A and 3B). The voice call session is an example of the call session described in FIGS. 3A and 3B. In FIG. 4C, the signal flow may include an interaction between first UE 13a, second UE 13b, centralized network 17a components (P-CSCF 21, S-CSCF 25, TAS 27a, MRF 29) and centralized network 17b components (TAS 27b and SCG 35b).

At step 70, the voice call session between first UE 13a and second UE 13b is in progress. At steps 71-80, a SIP reINVITE message is sent from first UE 13a to second UE 13b, via P-CSCF 21, S-CSCF 25, TAS 27a, TAS 27b and SCG 35b. The reINVITE message indicates that the second UE 13b is being invited to change parameters of the existing voice call session, to place the existing voice call session on hold.

At steps 81-90, responsive to the reINVITE message (at step 80), a 200 OK response is sent from second UE 13b to first UE 13a, via P-CSCF 21, S-CSCF 25, TAS 27a, TAS 27b and SCG 35b. The 200 OK response indicates that the request (in steps 71-80) was successful.

At step 91, responsive to first UE 13a receiving the 200 OK response (step 90), the voice call session between first UE 13a and second UE 13b is placed on hold.

Figure 4D:
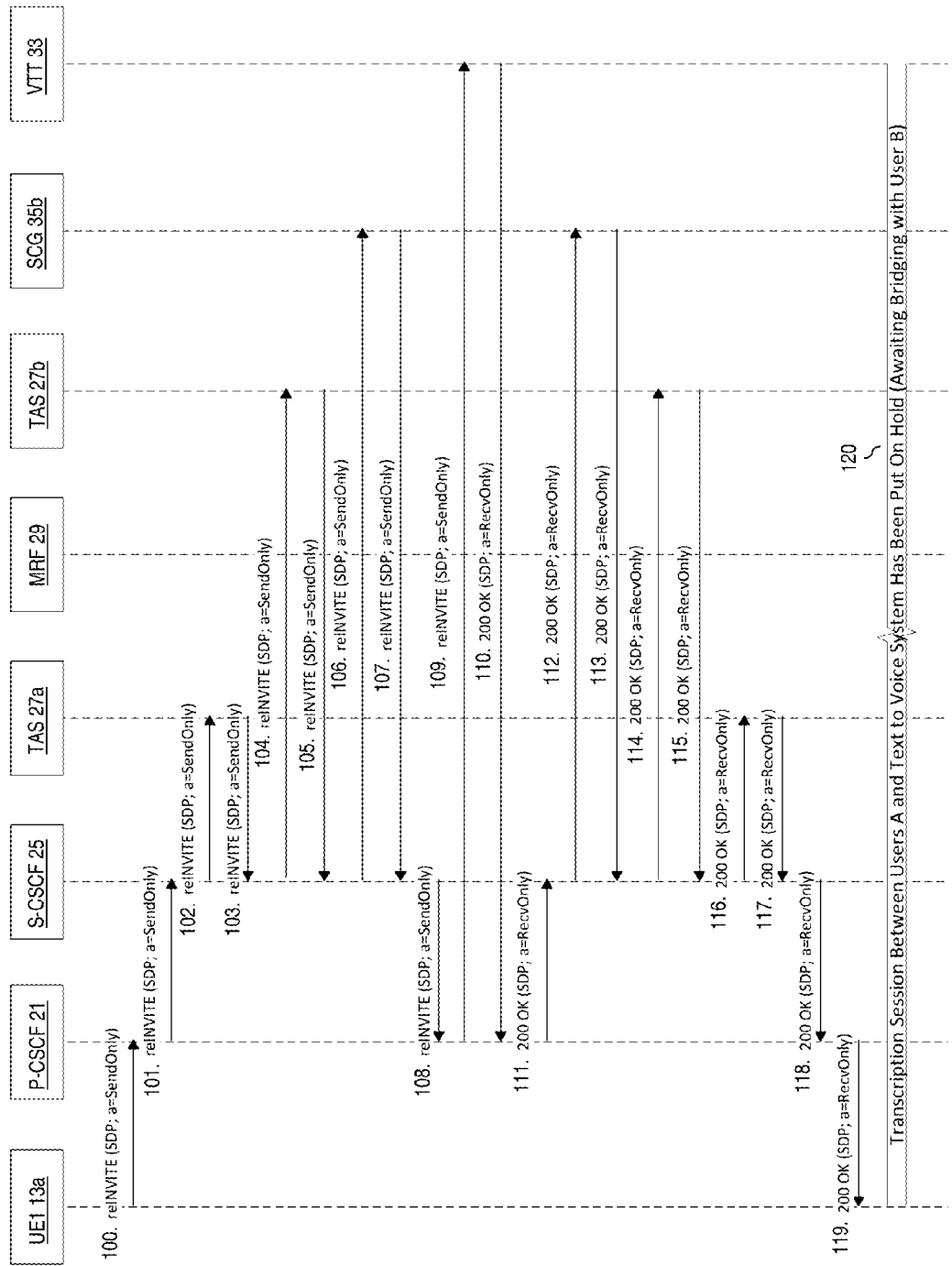
FIG. 4D is a signal flow diagram illustrating an example of placing the transcription session between the first mobile station and the VTT system on hold.

FIG. 4D is a signal flow diagram illustrating an example of placing the transcription session between first UE 13a and VTT 33 on hold (steps 310 and 344 in respective FIGS. 3A and 3B). In FIG. 4D, the signal flow may include an interaction between first UE 13a, VTT 33, centralized network 17a components (P-CSCF 21, S-CSCF 25, TAS 27a, MRF 29) and centralized network 17b components (TAS 27b and SCG 35b).

At steps 100-109, a reINVITE message is sent from first UE 13a to VTT 33, via P-CSCF 21, S-CSCF 25, TAS 27a, TAS 27b and SCG 35b. The reINVITE message indicates that the VTT 33 is being invited to change parameters of the existing transcription session, to place the existing transcription session on hold.

At steps 110-119, responsive to the reINVITE message (at step 109), a 200 OK response is sent from second VTT 33 to first UE 13a, via P-CSCF 21, S-CSCF 25, TAS 27a, TAS 27b and SCG 35b. The 200 OK response indicates that the request (in steps 100-109) was successful.

At step 120, responsive to first UE 13a receiving the 200 OK response (step 119), the transcription session between first UE 13a and VTT 33 is placed on hold.

Figure 5A:
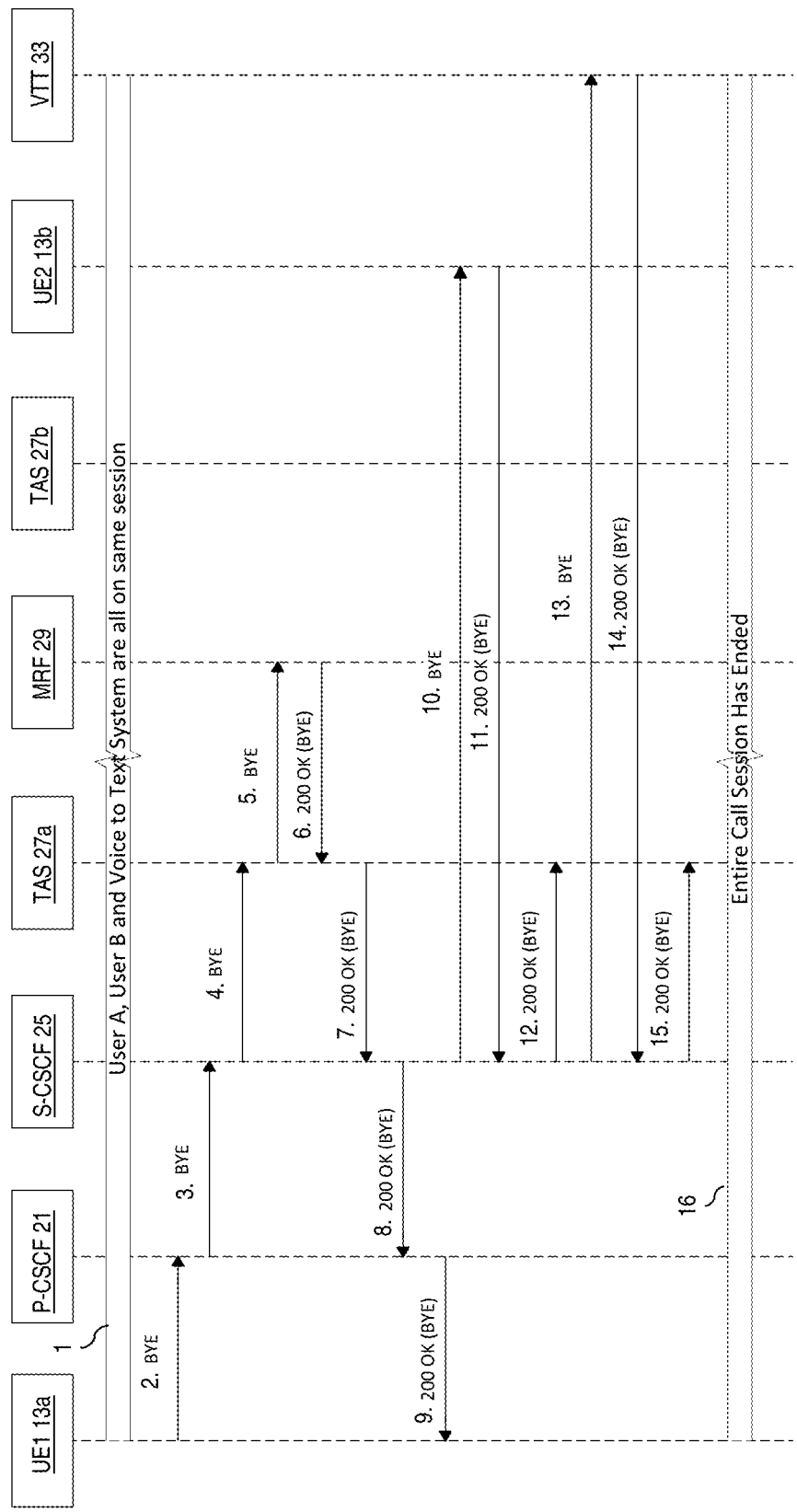
FIG. 5A is a signal flow diagram illustrating an example of ending a bridged communication session between the first mobile station, the second mobile station and the VTT system.

FIG. 5A is a signal flow diagram illustrating an example of ending a bridged communication session between first UE 13a, second UE 13b and VTT 33 (to end the entire communication session, i.e., both the call and the transcription). In FIG. 5A, the signal flow may include an interaction between first UE 13a, second UE 13b, VTT 33, centralized network 17a components (P-CSCF 21, S-CSCF 25, TAS 27a, MRF 29) and centralized network 17b components (TAS 27b).

At step 1, first UE 13a, second UE 13b and VTT 33 are all on a same (pending) bridged communication session (similar to steps 332 and 370 in respective FIGS. 3A and 3B).

At steps 2-5, a SIP BYE message is sent from first UE 13a to MRF 29, via P-CSCF 21, S-CSCF 25 and TAS 27a. The BYE message indicates that bridged session is being terminated.

At steps 6-9, responsive to the BYE message (step 5), a 200 OK response is sent from MRF 29 to first UE 13a, via P-CSCF 21, S-CSCF 25 and TAS 27a. The 200 OK response indicates that the request (BYE) (in steps 2-5) was successful.

At step 10, responsive to receiving the 200 OK response (step 7), a BYE message is sent to second UE 13b via S-CSCF 25. The BYE message indicates to second UE 13b that the bridged session is being terminated. At steps 11 and 12, responsive to the BYE message (step 10), a 200 OK message is sent from second UE 13b to TAS 27a, via S-CSCF 25. The 200 OK response indicates that the request (BYE) (in step 10) was successful.

At step 13, responsive to receiving the 200 OK response (step 11), a BYE message is sent to VTT 33 via S-CSCF 25.

The BYE message indicates to VTT 33 that the bridged session is being terminated. At steps 14 and 15, responsive to the BYE message (step 13), a 200 OK message is sent from VTT 33 to TAS 27a, via S-CSCF 25. The 200 OK response indicates that the request (BYE) (in step 13) was successful.

At step 16, responsive to the 200 OK message (step 15), the entire bridged communication session between first UE 13a, second UE 13b and VTT 33 is ended.

Figure 5B:
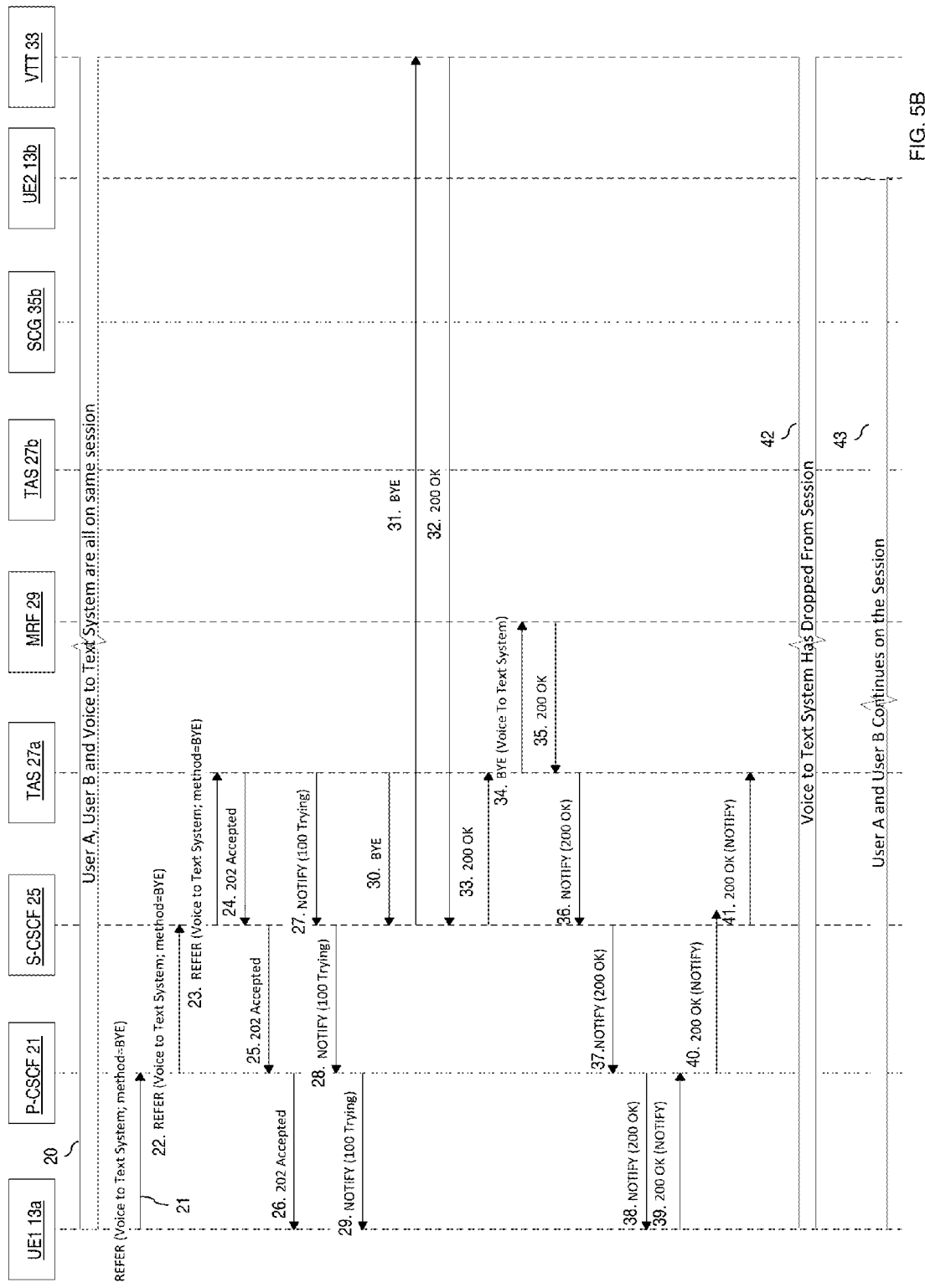
FIG. 5B is a signal flow diagram illustrating an example of ending participation of the VTT system in the bridged communication session while continuing the voice call between the first and second mobile stations.

FIG. 5B is a signal flow diagram illustrating an example of ending participation of VTT 33 (to end the transcription) while continuing the call between first UE 13a and second UE 13b over the bridged session (without ending the bridged session). In FIG. 5B, the signal flow may include an interaction between first UE 13a, second UE 13b, VTT 33, centralized network 17a components (P-CSCF 21, S-CSCF 25, TAS 27a, MRF 29) and centralized network 17b components (TAS 27b and SCG 35b).

At step 20, first UE 13a, second UE 13b and VTT 33 are all on a same (pending) bridged communication (transcription and call) session (similar to steps 332 and 370 in respective FIGS. 3A and 3B).

At steps 21-23, a SIP REFER message is sent from first UE 13a to TAS 27a, via P-CSCF 21 and S-CSCF 25. The REFER message requests VTT 33 to terminate the bridged session.

At steps 24-26, responsive to the REFER message (step 23), a SIP 202 Accepted response is sent from TAS 27a to first UE 13a, via P-CSCF 21 and S-CSCF 25. The 202 Accepted response indicates that the request has been accepted for processing, but that the processing has not been completed. At steps 27-29, a SIP NOTIFY message is sent from TAS 27a to first UE 13a, via P-CSCF 21 and S-CSCF 25. The NOTIFY message indicates a 100 trying response.

At steps 30-31, a BYE message is sent to VTT 33, via TAS 27a and S-CSCF 25. The BYE message requests termination of the VTT 33 connection in the bridged session.

At steps 32-33, responsive to the BYE message (step 31), a 200 OK response is sent from VTT 33 to TAS 27a, via S-CSCF 25. The 200 OK response indicates that the request (BYE) (in step 31) was successful.

At step 34, responsive to the OK response (step 33), a BYE message is sent from TAS 27a to MRF 29, indicating that the VTT 33 connection is being terminated. At step 35, responsive to the BYE message (step 34), a 200 OK response is sent from MRF 29 to TAS 27a, indicating that the request (BYE) (in step 34) was successful.

At steps 36-38, responsive to the 200 OK response (step 36), a NOTIFY message is sent from TAS 27a to first UE 13a, via P-CSCF 21 and S-CSCF 25. The NOTIFY message indicates a 200 OK response to the request (step 21) to terminate the VTT 33 connection in the bridged session.

At steps 39-41, responsive to the NOTIFY message (step 38), a 200 OK response is sent from first UE 13a to TAS 27a, via P-CSCF 21 and S-CSCF 25. The 200 OK response indicates that the request was successful.

At step 42, responsive to the 200 OK response (step 41), the connection of VTT 33 is dropped from the pending bridged session. At step 43, first UE 13a and second UE 13b continue to communicate over the bridged session.

FIGS. 6A-6C are example VTT transcription and call session screens that may be generated by first UE 13a and presented to a user by first UE 13a (e.g., by display 118 or display 122 in respective FIGS. 2A and 2B), during a VTT call transcription session. FIG. 6A illustrates a transcription/call session screen that permits user input of call parameters (e.g., video and/or voice call parameters) and displays a text transcription on a same window. FIG. 6B is similar to FIG. 6A, except that in FIG. 6B, the text transcription is presented in a popup box. FIG. 6C illustrates another example where the display only presents a text transcription of the call. It is understood that FIGS. 6A-6C illustrate several examples of VTT transcription/call session screens that may be presented by first UE 13a and that other suitable user input/output interface screens for transcription/call sessions are also permissible.

As shown by the above discussion, functions relating to the VTT call transcription service may be implemented on computers connected for data communication via the components of a packet data network, operating as the various servers as shown in FIG. 1. Although special purpose devices may be used, such devices also may be implemented using one or more hardware platforms intended to represent a general class of data processing device commonly used to run "server" programming so as to implement the VTT call transcription functions discussed above, albeit with an appropriate network connection for data communication. Other aspects of the VTT call transcription service may involve or be implemented on user terminal devices, such as smartphones, tablets or personal computers configured as the mobile stations 13a, 13b as shown in FIG. 1.

As known in the data processing and communications arts, a general-purpose computer typically comprises circuit elements forming a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the VTT call transcription service. For each of the computer platforms, the software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the VTT call transcription service, in essentially the manner performed in the implementations discussed and illustrated herein.

Figure 7:
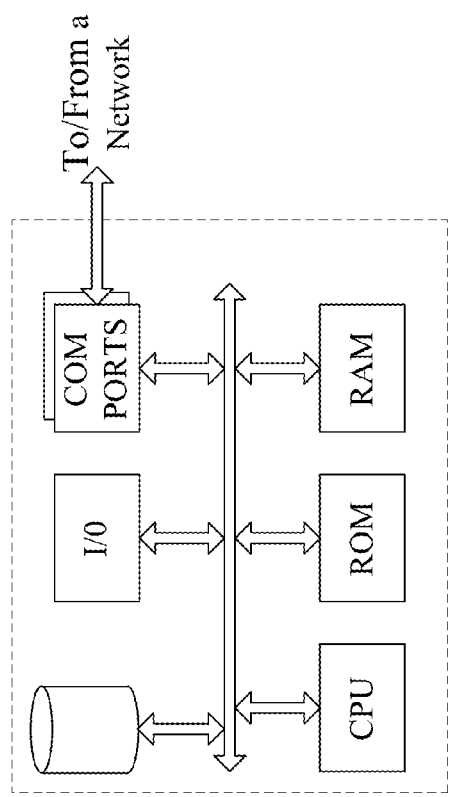
FIG. 7 is a simplified functional block diagram of a computer that may be configured as a host or server in the system of FIG. 1.
Figure 8:
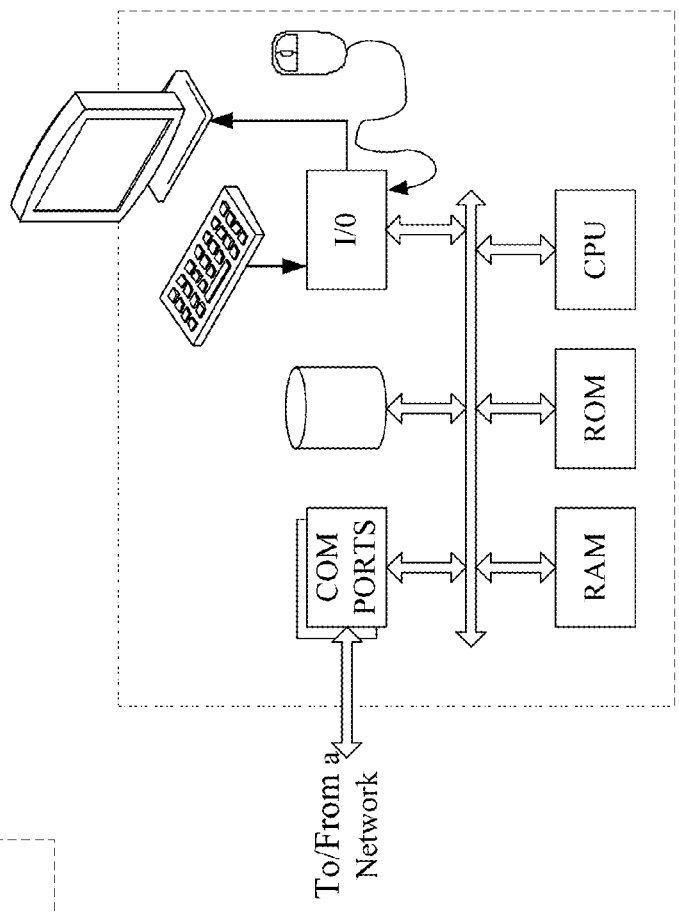
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server, including the TAS 27, the MRF 29 and the VTT 33 (FIG. 1). FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication. The server also includes hardware forming a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface, hardware forming a CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the VTT call transcription service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has a large number of acronyms to refer to various devices, messages and system components. Although generally known, use of several of these acronyms is not strictly standardized in the art. For the convenience of the reader, the following list correlates terms to acronyms, as used by way of example in the detailed description above.
API—Application Programming Interface
CD-ROM—Compact Disk Read Only Memory
CPU—Central Processing Unit
DVD—Digital Video Disk
DVD-ROM—Digital Video Disk Read Only Memory
EEPROM—Electrically Erasable Programmable Read Only Memory
eHRPD—Evolved High Rate Packet Data
EMS—Enhanced Messaging Service
EPROM—Erasable Programmable Read Only Memory
FLASH-EPROM—Flash Erasable Programmable Read Only Memory
HMM—Hidden Markov Model
HSPA—High-Speed Packet Access
HSS—Home Subscriber Server
HTTP—Hypertext Transfer Protocol
I-CSCF—Interrogating Call Session Control Function
IMS—Internet Protocol Multimedia Subsystem
IP—Internet Protocol
LAN—Local Area Network
LTE—Long Term Evolution
MAN—Metropolitan Area Network
MMS—Multimedia Messaging Service
MRF—Media Resource Function
MRFC—Media Resource Function Controller
MRFP—Media Resource Function Processor
MS—Mobile Station
PROM—Programmable Read Only Memory
PC—Personal Computer
P-CSCF—Proxy Call Session Control Function
PDA—Personal Digital Assistant
PGW—Packet Data Network Gateway
PSTN—Public Switched Telephone Network
RAM—Random Access Memory
RF—Radio Frequency
RIM—Research In Motion
ROM—Read Only Memory
SCG—Service Continuity Gateway
S-CSCF—Serving Call Session Control Function
SIP—Session Initiation Protocol
SMS—Short Message Service
TAS—Telephony Application Server
UE—User Equipment
VoIP—Voice Over Internet Protocol
VTT—Voice to text
WAN—Wide Area Network
WLAN—Wireless Local Area Network
WWAN—Wireless Wide Area Network

What is claimed is:

1. A method, comprising:
receiving, by at least one server device through a wireless communication network, a request from a mobile device to initiate a transcription of a voice communication of a call between the mobile device and a device;
establishing, by the at least one server device through the wireless communication network and based on the request, a transcription session between the mobile device and a voice to text (VTT) system prior to establishing a bridged communication session;
placing, by the at least one server device, the transcription session on hold during establishment of the bridged communication session between the at least one server device, the mobile device, the device, and the VTT system;
establishing, by the at least one server device and after placing the transcription session on hold, the bridged communication session, where the bridged communication session includes the call between the mobile device and the device; and
sending, by the at least one server device through the wireless communication network, a notification message to the mobile device when the VTT system has joined the bridged communication session, where the notification message causes the mobile device to terminate the hold placed on the transcription session, and where the VTT system converts the voice communication of the call to a text transcription upon termination of the hold placed on the transcription session, and the VTT system sends the text transcription to the mobile device.

2. The method of claim 1, wherein the text transcription is sent to the mobile device via at least one of a short messaging service, an enhanced messaging service, a multimedia messaging service or a hypertext transfer protocol (HTTP)-based service.

3. The method of claim 1, wherein the call is associated with a call session between the mobile device and the device established prior to the request to initiate the transcription, the call session being terminated when the bridged communication session is established.

4. The method of claim 1, further comprising:
receiving, by the at least one server device, a message from the mobile device to initiate the call between the mobile device and the device,
the message including the request to initiate the transcription, and
the bridged communication session being established based on the request to initiate the transcription.

5. The method of claim 4, wherein the request to initiate the transcription is included without user input in the message to initiate the call, based on at least one of:
information associated with a user of the device,
a type of phone number being called,
a predetermined time period,
a predetermined day, or
a location of the mobile device.

6. The method of claim 1, further comprising:
receiving, by the at least one server device, a message from the device to initiate the call between the mobile device and the device;
sending, by the at least one server device, a call request to the mobile device to join the call, based on the message to initiate the call; and receiving, by the at least one server device, the request from the mobile device to initiate the transcription based on the call request.

7. The method of claim 1, further comprising:
receiving, by the at least one server device, a request from the mobile device to terminate the bridged communication session between the mobile device, the device, and the VTT system; and
sending, by the at least one server device, to the mobile device, the device, and the VTT system, an instruction to terminate the bridged communication session based on the request to terminate the bridged communication session.

8. The method of claim 1, further comprising:
receiving, by the at least one server device, a request from the mobile device or the device to terminate the text transcription of the call;
sending, by the at least one server device, to the VTT system, an instruction to terminate the bridged communication session with the VTT system, based on the request to terminate the text transcription of the call; and
maintaining the call between the mobile device and the device via the bridged communication session.

9. A server device, comprising:
a memory to store instructions; and
one or more processors, to execute the instructions in the memory, to:
receive, through a wireless communication network, a request from a mobile device to initiate a transcription of a voice communication of a call between the mobile device and a device,
establish, based on the request and through the wireless communication network, a transcription session between the mobile device and a voice to text (VTT) system prior to establishing a bridged communication session;
place the transcription session on hold during establishment of the bridged communication session between the server device, the mobile device, the device, and the VTT system;
establish, after placing the transcription session on hold, the bridged communication session, where the bridged communication session includes the call between the mobile device and the device; and
send, through the wireless communication network, a notification message to the mobile device when the VTT system has joined the bridged communication session, where the notification message causes the mobile device to terminate the hold placed on the transcription session, and
where the VTT system converts the voice communication of the call to a text transcription upon termination of the hold placed on the transcription session, and the VTT system sends the text transcription to the mobile device.

10. The server device of claim 9, wherein the one or more processors are further to:
receive, from the mobile device, a message to initiate the call between the mobile device and the device,
the message including the request to initiate the transcription, and
the bridged communication session being established based on the request to initiate the transcription.

11. The server device of claim 10, wherein the request to initiate the transcription is automatically included in the message to initiate the call based on at least one of:

information associated with a user of the device,
a type of phone number being called,
a predetermined time period,
a predetermined day, or
a location of the mobile device.

12. The server device of claim 9, wherein the one or more processors are further to:
receive, from the device, a message to initiate the call between the mobile device and the device;
send a call request to the mobile device to join the call, based on the message to initiate the call; and
receive, from the mobile device, the request to initiate the transcription based on the call request.

13. The server device of claim 9, wherein the one or more processors are further to:
receive, from the mobile device or the device, a request to terminate the bridged communication session; and
send, to the mobile device, the device, and the VTT system, an instruction to terminate the bridged communication session based on the request to terminate the bridged communication session.

14. The server device of claim 9, wherein mobile device provides the text transcription for display.

15. A non-transitory computer readable medium that stores instructions, the instructions comprising:
one or more instructions that, when executed by one or more processors of a server device, cause the one or more processors to:
receive, through a wireless communication network, a request from a mobile device to initiate a transcription of a voice communication of a call between the mobile device and a device;
establish, based on the request and through the wireless communication network, a transcription session between the mobile device and a voice to text (VTT) system prior to establishing a bridged communication session;
place the transcription session on hold during establishment of the bridged communication session between the server device, the mobile device, the device, and the VTT system;
establish, after placing the transcription session on hold, the bridged communication session, where the bridged communication session includes the call between the mobile device and the device; and
send, through the wireless communication network, a notification message to the mobile device when the VTT system has joined the bridged communication session, where the notification message causes the mobile device to terminate the hold placed on the transcription session, and
where the VTT system converts the voice communication of the call to a text transcription upon termination of the hold placed on the transcription session, and the VTT system sends the text transcription to the mobile device.

16. The non-transitory computer readable medium of claim 15, wherein the instructions further comprise:
one or more instructions that, when executed by the one or more processors, cause the one or more processors to:
receive, from the mobile device, a message to initiate the call between the mobile device and the device,
the message including the request to initiate the transcription, and
the bridged communication session being established based on the request to initiate the transcription.

17. The non-transitory computer readable medium of claim 15, wherein the call is associated with a call session between the mobile device and the device established prior to the request to initiate the transcription, the call session being terminated when the bridged communication session is established.

18. The non-transitory computer readable medium of claim 15, wherein the instructions further comprise:

one or more instructions that, when executed by the one or more processors, cause the one or more processors to:

receive, from the mobile device or the device, a request to terminate the text transcription of the call;

send, to the VTT system, an instruction to terminate the bridged communication session with the VTT system based on the request to terminate the text transcription of the call; and maintain the call between the mobile device and the device via the bridged communication session.

19. The non-transitory computer readable medium of claim 15, where the mobile device provides the text transcription for display.

20. The non-transitory computer readable medium of claim 15, where the text transcription is sent to the mobile device via one of:

a short messaging service, an enhanced messaging service, a multimedia messaging service, or a hypertext transfer protocol (HTTP)-based service, establishing, by the at least one server device and after placing the transcription session on hold, the bridged communication session, where the bridged communication session includes the call between the mobile device and the device; and sending, by the at least one server device through the wireless communication network, a notification message to the mobile device when the VTT system has joined the bridged communication session, where the notification message causes the mobile device to terminate the hold placed on the transcription session, and where the VTT system converts the voice communication of the call to a text transcription upon termination of the hold placed on the transcription session, and the VTT system sends the text transcription to the mobile device.

* * * * *